US011067977B2

(12) United States Patent
Su

(10) Patent No.: US 11,067,977 B2
(45) Date of Patent: Jul. 20, 2021

(54) WEARABLE DEVICE, APPARATUS FOR CONTROLLING UNMANNED AERIAL VEHICLE AND METHOD FOR REALIZING CONTROLLING

(71) Applicant: Goertek Inc., Weifang (CN)

(72) Inventor: Pengcheng Su, Weifang (CN)

(73) Assignee: Goertek Inc., Weifang (CN)

( * ) Notice: Subject to any disclaimer, the term of this patent is extended or adjusted under 35 U.S.C. 154(b) by 429 days.

(21) Appl. No.: 16/079,100

(22) PCT Filed: Mar. 16, 2017

(86) PCT No.: PCT/CN2017/076902
§ 371 (c)(1),
(2) Date: Aug. 23, 2018

(87) PCT Pub. No.: WO2017/157313
PCT Pub. Date: Sep. 21, 2017

(65) Prior Publication Data
US 2019/0056725 A1 Feb. 21, 2019

(30) Foreign Application Priority Data

Mar. 17, 2016 (CN) .......................... 201610153736.1

(51) Int. Cl.
*G05D 1/00* (2006.01)
*G05D 1/08* (2006.01)
(Continued)

(52) U.S. Cl.
CPC .......... *G05D 1/0016* (2013.01); *B64C 39/024* (2013.01); *G05D 1/0022* (2013.01);
(Continued)

(58) Field of Classification Search
CPC .. G05D 1/0016; G05D 1/0022; G05D 1/0033; G05D 1/08; G05D 1/0808;
(Continued)

(56) References Cited

U.S. PATENT DOCUMENTS 9,170,117 B1 10/2015 Abuelsaad et al.
9,412,278 B1 * 8/2016 Gong .................. G08G 5/0091

FOREIGN PATENT DOCUMENTS

CN 104639966 A 5/2015
CN 104808799 A 7/2015
(Continued)

OTHER PUBLICATIONS

International Bureau of WIPO, International Search Report and Written Opinion in Application No. PCT/CN2017/076902 dated Jun. 1, 2017.
(Continued)

*Primary Examiner* — Gertrude Arthur Jeanglaude
(74) *Attorney, Agent, or Firm* — LKGlobal | Lorenz & Kopf, LLP

(57) ABSTRACT

A wearable device comprises: a hand gesture configuring and identifying module, for collecting feature data to be identified of a wearer by a sensor, identifying out a current hand gesture action of the wearer, searching a correspondence relation between a hand gesture action and an unmanned aerial vehicle control command that is configured and saved in advance, and sending an unmanned aerial vehicle control command corresponding to the hand gesture action to the ground control station module; a ground control station module, for receiving the unmanned aerial vehicle control command by using a data interface, encoding the control command, converting it into a control message and then sending it to the wireless transmission module; and a wireless transmission module for receiving the control mes-
(Continued)

sage and wirelessly sending it to the unmanned aerial vehicle, to realize controlling the flight state of the unmanned aerial vehicle according to the control message.

16 Claims, 6 Drawing Sheets

(51) Int. Cl.
  *G06F 3/01* (2006.01)
  *G06F 1/16* (2006.01)
  *B64C 39/02* (2006.01)
  *G06F 3/0484* (2013.01)
  *G06F 3/0488* (2013.01)
(52) U.S. Cl.
  CPC ............ *G05D 1/0033* (2013.01); *G05D 1/08* (2013.01); *G05D 1/0808* (2013.01); *G06F 1/163* (2013.01); *G06F 3/017* (2013.01); *G06F 3/0484* (2013.01); *G06F 3/04883* (2013.01); *B64C 2201/146* (2013.01)
(58) Field of Classification Search
  CPC . B64C 39/024; B64C 2201/146; G06F 1/163; G06F 3/017; G06F 3/0484; G06F 3/04883
  USPC .............................................. 701/2
  See application file for complete search history.

(56) References Cited

FOREIGN PATENT DOCUMENTS

| CN | 104834249 A |   | 8/2015 |
| --- | --- | --- | --- |
| CN | 104950902 A |   | 9/2015 |
| CN | 204808575 U | * | 11/2015 |
| CN | 204808575 U |   | 11/2015 |
| CN | 105184325 A |   | 12/2015 |
| CN | 105185083 A |   | 12/2015 |
| CN | 105242779 A |   | 1/2016 |
| CN | 105283816 A |   | 1/2016 |
| CN | 105302021 A |   | 2/2016 |
| CN | 105676860 A |   | 6/2016 |

OTHER PUBLICATIONS

Chinese Patent Office, Examination Report in Application No. 201610153736.1 dated Feb. 24, 2018.

* cited by examiner

| Hand gesture action | Description | Corresponding control command |
|---|---|---|
|  | Drawing a first zigzag line from a lower to an upper direction | Takeoff |
|  | Drawing a first zigzag line from an upper to a lower direction | Landing |
| 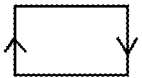 | Drawing a rectangle in a clockwise direction | Turning right |
|  | Drawing a rectangle in an anticlockwise direction | Turning left |
| 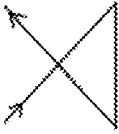 | Drawing a second zigzag line from a lower to an upper direction | Lifting |
| 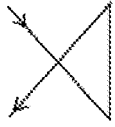 | Drawing a second zigzag line from an upper to a lower direction | Descending |
|  | Drawing a triangle in a clockwise direction | Hovering |

FIG. 9

WEARABLE DEVICE, APPARATUS FOR CONTROLLING UNMANNED AERIAL VEHICLE AND METHOD FOR REALIZING CONTROLLING

CROSS REFERENCE TO RELATED APPLICATIONS

This Application is a U.S. National Stage entry under 35 U.S.C. § 371 based on International Application No. PCT/CN2017/076902, filed on Mar. 16, 2017, which was published under PCT Article 21(2) and which claims priority to Chinese Patent Application No. 201610153736.1, filed on Mar. 17, 2016 which are all hereby incorporated herein by reference in their entirety.

TECHNICAL FIELD

This Application pertains to the field of human-machine interaction, and particularly relates to a wearable device, an apparatus for controlling an unmanned aerial vehicle and a method for realizing controlling.

BACKGROUND

As technology advances, unmanned aerial vehicles (UAV) have been developed rapidly. Unmanned aerial vehicles complete different kinds of tasks by using wireless remote control or embedded program control in place of labor. Miniature unmanned aerial vehicles have been extensively used in civil fields due to the advantages of small volume, low cost and convenient use.

Presently, the control system of unmanned aerial vehicles generally comprises a flying control board located on the fuselage, a ground control system (GCS) that runs on devices such as a personal computer (PC), a remote controller, etc. The flying control board acquires the attitude of the unmanned aerial vehicle and controls the flight of the unmanned aerial vehicle by using the built-in accelerometer, gyroscope, terrestrial magnetism sensor, etc. The ground control system operating on the ground computer is equivalent to the flight cabin of manned aerial vehicles, and is the command center of the whole unmanned aerial vehicle system. The ground control system establishes a connection with the unmanned aerial vehicle by wireless data transmission technique, and can display the position and flight data of the unmanned aerial vehicle in real time to monitor the flight state of the unmanned aerial vehicle, and conduct adjusting and intervention accordingly, such as controlling the flight mode and parameters of the unmanned aerial vehicle, customizing the flight mission, etc. In addition, for safety and convenience, a remote controller is generally provided to manually and remotely control the unmanned aerial vehicle.

As stated above, typical controlling methods of an unmanned aerial vehicle need at least a PC and a remote controller, which are very inconvenient to carry and operate, so the user experience is poor. In addition, other objects, desirable features and characteristics will become apparent from the subsequent summary and detailed description, and the appended claims, taken in conjunction with the accompanying drawings and this background.

SUMMARY

This Application provides a wearable device, an apparatus for controlling an unmanned aerial vehicle and a method for realizing controlling, to solve the problems of inconvenient carrying and operating and poor user experience in the existing controlling methods of unmanned aerial vehicles.

According to an aspect of this Application, there is provided a wearable device, comprising: a hand gesture configuring and identifying module, a ground control station module and a wireless transmission module;

the hand gesture configuring and identifying module is for collecting feature data to be identified of a wearer by a sensor, identifying out a current hand gesture action of the wearer, searching a correspondence relation between a hand gesture action and an unmanned aerial vehicle control command that is configured and saved in advance, and sending an unmanned aerial vehicle control command corresponding to the hand gesture action to the ground control station module;

the ground control station module is for receiving the unmanned aerial vehicle control command by using a data interface between the ground control station module and the hand gesture configuring and identifying module, encoding the unmanned aerial vehicle control command and converting it into a control message that meets an unmanned aerial vehicle communication protocol, and sending the control message to the wireless transmission module; and the wireless transmission module is for receiving the control message and wirelessly sending the control message to the unmanned aerial vehicle to realize controlling a flight state of the unmanned aerial vehicle according to the control message.

Optionally, the hand gesture configuring and identifying module is provided therein with a default hand gesture action, and the hand gesture configuring and identifying module establishes and then saves a correspondence relation between the default hand gesture action and an unmanned aerial vehicle control command; or, the hand gesture configuring and identifying module identifies a self-chosen hand gesture action inputted by the wearer via an interaction interface of the wearable device, and establishes and then saves a correspondence relation between the self-chosen hand gesture action and an unmanned aerial vehicle control command.

Optionally, the hand gesture configuring and identifying module establishes the correspondence relation between the default hand gesture action and the unmanned aerial vehicle control command particularly by:

defining a hand gesture action of drawing a first zigzag line from an upper direction to a lower direction and a hand gesture action of drawing a first zigzag line from a lower direction to an upper direction to correspond to a landing control command and a takeoff control command of the unmanned aerial vehicle respectively;

defining a hand gesture action of drawing a rectangle in a clockwise direction and a hand gesture action of drawing a rectangle in an anticlockwise direction to correspond to a right turning control command and a left turning control command of the unmanned aerial vehicle respectively;

defining a hand gesture action of drawing a second zigzag line from an upper direction to a lower direction and a hand gesture action of drawing a second zigzag line from a lower direction to an upper direction to correspond to a lifting control command and a descending control command of the unmanned aerial vehicle respectively; and defining a hand gesture action of drawing a triangle in a clockwise direction to correspond to a hovering control command of the unmanned aerial vehicle.

Optionally, the hand gesture configuring and identifying module is particularly for collecting a three-axis acceleration data sequence or a three-axis angular velocity data sequence to be identified of the wearer by a three-axis acceleration sensor or a three-axis angular velocity sensor;

extracting a feature from the three-axis acceleration data sequence or the three-axis angular velocity data sequence by using principal component analysis, and reducing a dimension of the three-axis acceleration data sequence or the three-axis angular velocity data sequence to one dimension; and comparing one-dimensional acceleration data sequence or one-dimensional angular velocity data sequence obtained by reducing dimension with a corresponding template feature data sequence, to identify out the current hand gesture action of the wearer;

wherein the template feature data sequence comprises an acceleration template data sequence and an angular velocity template data sequence, and the dimension of the acceleration template data sequence and the dimension of the angular velocity template data sequence are one dimension.

Optionally, the wearable device further comprises: a mode controlling module, for receiving an externally inputted instruction or detecting a current quantity of electricity of the wearable device, and when the externally inputted instruction is to activate hand gesture controlling or the current quantity of electricity satisfies a condition for activating hand gesture controlling, notifying the hand gesture configuring and identifying module to collect feature data to be identified of the wearer by a sensor.

Optionally, the ground control station module provides a user interaction interface adapted for a screen size and an operating system of the wearable device, and displays flight data fed back by the unmanned aerial vehicle and acquired from the wireless transmission module via the user interaction interface; and receives a flight mission, a flight mode and flight data set by the user via the user interaction interface.

Optionally, the wireless transmission module is a Bluetooth wireless transmission module; and the Bluetooth wireless transmission module establishes a connection with a Bluetooth communication module of the unmanned aerial vehicle, and sends the control message to the unmanned aerial vehicle by Bluetooth communication;

or, the Bluetooth wireless transmission module establishes a connection with a wireless data communication unit external to the wearable device, and communicates with a wireless communication module of the unmanned aerial vehicle via the wireless data communication unit, to send the control message to the unmanned aerial vehicle.

Optionally, the wireless transmission module of the unmanned aerial vehicle is a Bluetooth wireless transmission module; and the Bluetooth wireless transmission module receives a signal fed back by the unmanned aerial vehicle.

According to another aspect of this Application, there is provided an apparatus for controlling an unmanned aerial vehicle, and the apparatus for controlling an unmanned aerial vehicle comprises: a wireless communication module, a command parsing module and a flight controlling module;

the wireless communication module is for wirelessly communicating with a wearable device, receiving a control message sent by the wearable device, and sending the control message to the command parsing module;

the command parsing module is for parsing the received control message, and sending the control command obtained by parsing to the flight controlling module; and the flight controlling module is for controlling a flight state of the unmanned aerial vehicle according to the received control command.

Optionally, the flight controlling module is particularly for calculating target values of corresponding flight control parameters of the unmanned aerial vehicle according to the received control command, and operating a proportion integration differentiation PID controller to generate a controlling signal by using acquired current values of the corresponding flight control parameters of the unmanned aerial vehicle, to adjust a rotational speed of a rotor wing of the unmanned aerial vehicle and further realize controlling the flight state of the unmanned aerial vehicle.

According to yet another aspect of this Application, there is provided a method for realizing controlling an unmanned aerial vehicle by a wearable device, the wearable device is provided therein with a sensor, and the method comprises:

by the wearable device, collecting feature data to be identified of a wearer by using the sensor, and identifying out a current hand gesture action of the wearer;

by the wearable device, finding an unmanned aerial vehicle control command corresponding to the current hand gesture action by using a correspondence relation between corresponding hand gesture actions and unmanned aerial vehicle control commands that is configured and saved in advance, and then encoding the unmanned aerial vehicle control command and generating a control message that meets an unmanned aerial vehicle communication protocol; and by the wearable device, wirelessly sending the generated control message to the unmanned aerial vehicle, to enable the unmanned aerial vehicle to control the flight state according to the control message.

Optionally, the method further comprises: establishing the correspondence relation between the corresponding hand gesture actions and the unmanned aerial vehicle control commands by:

by the wearable device, receiving a control command selected by the wearer from an unmanned aerial vehicle control command list presented in an interaction interface of the wearable device, and establishing a correspondence relation between the control command selected by the wearer and the corresponding hand gesture action; or, receiving a terminating instruction of the wearer, and terminating the correspondence relation between the control command of the unmanned aerial vehicle and the corresponding hand gesture action; wherein the corresponding hand gesture action comprises a default hand gesture action and a self-chosen hand gesture action.

Optionally, the method further comprises: by the wearable device, establishing a correspondence relation between the default hand gesture action and the unmanned aerial vehicle control command by:

defining a hand gesture action of drawing a first zigzag line from an upper direction to a lower direction and a hand gesture action of drawing a first zigzag line from a lower direction to an upper direction to correspond to a landing control command and a takeoff control command of the unmanned aerial vehicle respectively;

defining a hand gesture action of drawing a rectangle in a clockwise direction and a hand gesture action of drawing a rectangle in an anticlockwise direction to correspond to a right turning control command and a left turning control command of the unmanned aerial vehicle respectively;

defining a hand gesture action of drawing a second zigzag line from an upper direction to a lower direction and a hand gesture action of drawing a second zigzag line from a lower direction to an upper direction to correspond to a lifting control command and a descending control command of the unmanned aerial vehicle respectively; and defining a hand gesture action of drawing a triangle in a clockwise direction to correspond to a hovering control command of the unmanned aerial vehicle.

Optionally, the step of by the wearable device, collecting feature data to be identified of a wearer by using the sensor, and identifying out a current hand gesture action of the wearer comprises:

collecting a three-axis acceleration data sequence or a three-axis angular velocity data sequence to be identified of the wearer by a three-axis acceleration sensor or a three-axis angular velocity sensor;

extracting a feature from the three-axis acceleration data sequence or the three-axis angular velocity data sequence by using principal component analysis, and reducing a dimension of the three-axis acceleration data sequence or the three-axis angular velocity data sequence to one dimension; and comparing one-dimensional acceleration data sequence or one-dimensional angular velocity data sequence obtained by reducing dimension with a corresponding template feature data sequence, to identify out the current hand gesture action of the wearer;

wherein the template feature data sequence comprises an acceleration template data sequence and an angular velocity template data sequence, and the dimension of the acceleration template data sequence and the dimension of the angular velocity template data sequence are one dimension.

Optionally, the method for realizing controlling an unmanned aerial vehicle by a wearable device further comprises:

by the wearable device, receiving an externally inputted instruction or detecting a current quantity of electricity of the wearable device, and when the externally inputted instruction is to activate hand gesture controlling or the current quantity of electricity satisfies a condition for activating hand gesture controlling, collecting feature data to be identified of the wearer by a sensor.

Optionally, the method for realizing controlling an unmanned aerial vehicle by a wearable device further comprises:

by the wearable device, providing a user interaction interface adapted for a screen size and an operating system of the wearable device, and displaying flight data fed back by the unmanned aerial vehicle via the user interaction interface; and receiving a flight mission, a flight mode and flight data set by the user via the user interaction interface.

Optionally, the step of by the wearable device, wirelessly sending the generated control message to the unmanned aerial vehicle comprises:

by the wearable device, establishing a connection with a Bluetooth communication module of the unmanned aerial vehicle, and sending the control message to the unmanned aerial vehicle by Bluetooth communication;

or, by the wearable device, establishing a connection with a wireless data communication unit external to the wearable device, and communicating with a wireless communication module of the unmanned aerial vehicle via the wireless data communication unit, to send the control message to the unmanned aerial vehicle.

According to still another aspect of this Application, there is provided a method for realizing controlling an unmanned aerial vehicle by a wearable device, and the method comprises:

monitoring a connection request of the wearable device, and establishing a wireless communication with the wearable device, and receiving a control message sent by the wearable device;

parsing the control message to obtain an unmanned aerial vehicle control command; and controlling a flight state of the unmanned aerial vehicle according to the unmanned aerial vehicle control command.

The advantageous effects of this Application are as follows. According to this Application, the ground control system of the unmanned aerial vehicle operates in the wearable device which has a built-in sensor. The user can conduct convenient and intuitive control for the unmanned aerial vehicle by executing a certain hand gesture action via the wearable device being worn, and need not carry other devices such as a ground control system or a remote controller, thereby avoiding complicated control by other devices. Such a mode of hand gesture identification based on a sensor in the wearable device is flexible and reliable, unaffected by environment and light, and can be realized by a simple system. Further, wearable devices are generally worn on the body of the user for a long time, and if the user can give different unmanned aerial vehicle control commands by executing certain hand gesture actions at any moment, the interaction between the wearer and the unmanned aerial vehicle can be realized more conveniently and intuitively, and the user experience can be enhanced greatly compared with the traditional modes of controlling an unmanned aerial vehicle.

BRIEF DESCRIPTION OF DRAWINGS

The present invention will hereinafter be described in conjunction with the following drawing figures, wherein like numerals denote like elements, and:

FIG. 9 is a table illustrating a correspondence relation between hand gesture actions and different control commands of an unmanned aerial vehicle.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

The core concept of this Application is as follows. Wearable devices such as smart watches have been swiftly developed. They have their own computing ability and resource, and generally have various MEMS (Micro-Electro Mechanical Systems) sensors embedded therein. Data operation and hand gesture identification based on the sensors provide software and hardware support for controlling an unmanned aerial vehicle by using a smart watch, and such a hand gesture identifying and controlling mode is flexible and reliable, unaffected by environment and light, and can be realized by a simple system. In addition, wearable devices are generally worn on the body of the user for a long time. If the ground control system of the unmanned aerial vehicle is moved to the smart watch, the user can conduct monitoring and controlling operations for the unmanned aerial vehicle on the smart watch at any moment. Additionally, the smart watch may also be used to replace and execute the functions of remote controllers in the prior art, and unmanned aerial vehicle control commands can be given merely by executing certain hand gesture actions, thereby more conveniently and intuitively realizing the interaction between the user and the unmanned aerial vehicle, and enhancing the user experience.

First Embodiment

Figure 1:
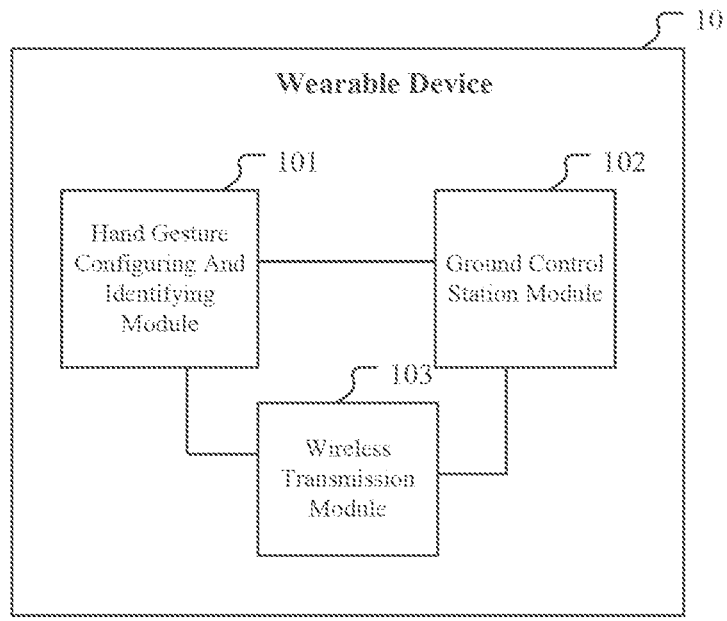
FIG. 1 is a structural block diagram of a wearable device according to an embodiment of this Application.

FIG. 1 is a structural block diagram of a wearable device according to an embodiment of this Application. Referring to FIG. 1, the wearable device 10 comprises: a hand gesture configuring and identifying module 101, a ground control station module 102 and a wireless transmission module 103.

The hand gesture configuring and identifying module 101 is for collecting feature data to be identified of a wearer by a sensor, identifying out a current hand gesture action of the wearer, looking for a correspondence relation between a hand gesture action and an unmanned aerial vehicle control command that is configured and saved in advance, and sending an unmanned aerial vehicle control command corresponding to the hand gesture action to the ground control station module 102.

The ground control station module 102 is for receiving the unmanned aerial vehicle control command by using a data interface between the ground control station module 102 and the hand gesture configuring and identifying module 101, encoding the unmanned aerial vehicle control command and converting it into a control message that meets an unmanned aerial vehicle communication protocol, and sending the control message to the wireless transmission module 103.

The wireless transmission module 103 is for receiving the control message and wirelessly sending the control message to the unmanned aerial vehicle to realize controlling a flight state of the unmanned aerial vehicle according to the control message.

The wearable device integrated with the ground control station module of FIG. 1 collects the hand gesture action executed by the user using the built-in sensor, and the ground control station module converts the hand gesture into a corresponding unmanned aerial vehicle control command and sends it to the unmanned aerial vehicle, to enable the unmanned aerial vehicle to change a corresponding flight mode or flight state according to the received control command. Thereby, the user can realize controlling the unmanned aerial vehicle conveniently and intuitively merely by making hand gestures, and the cumbersomeness of carrying and operating other controlling devices such as a remote controller can be avoided, which enhances the user experience.

In addition, in order to realize controlling the unmanned aerial vehicle by a wearable device such as a smart watch, the following technical difficulties must be overcome:

(1) The hand gesture identification based on wearable devices must consider calculation amount and power consumption. The resource of wearable devices such as a smart watch is limited, and in the process of hand gesture identification, continuously detecting actions will consume a lot of energy. Therefore, effective measures must be adopted to ensure the reliability of hand gesture action identifying while reducing the complexity of the algorithms and the calculation amount.

(2) How to realize corresponding unmanned aerial vehicle control commands by different hand gesture actions, and control the unmanned aerial vehicle?

(3) How the ground control system is adapted of for wearable devices such as a smart watch?

The technical means adopted by this Application to overcome the above technical difficulties will be described particularly below by referring to other embodiments of this Application.

Second Embodiment

Figure 2:
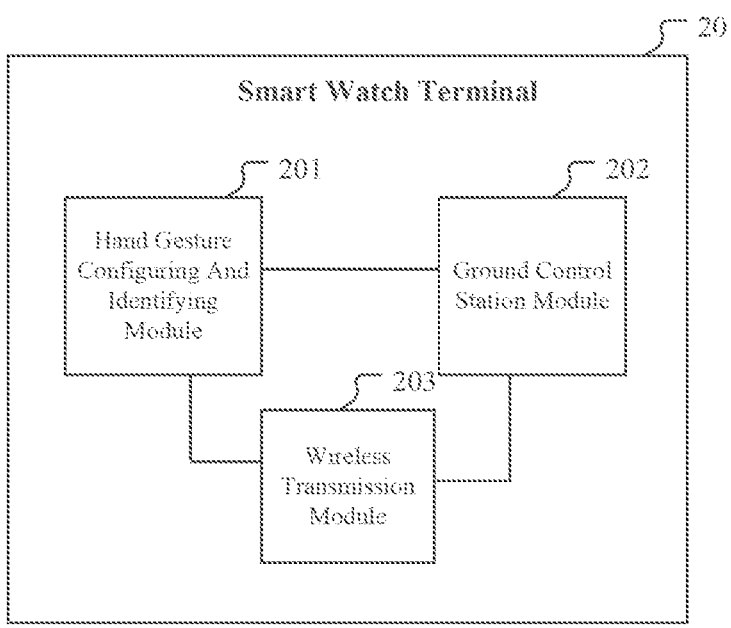
FIG. 2 is a structural block diagram of a smart watch terminal according to an embodiment of this Application.

FIG. 2 is a structural block diagram of a smart watch terminal according to an embodiment of this Application. The present embodiment schematically describes the functional structure of the wearable device mainly by taking a smart watch as an example. Other contents may be found in other embodiments of this Application.

When the unmanned aerial vehicle is controlled by using a smart watch for the first time, the smart watch establishes a connection with the unmanned aerial vehicle by wireless modes such as BLE (Bluetooth Low Energy) before the unmanned aerial vehicle is controlled. The smart watch establishes a correspondence relation between self-chosen hand gesture actions or default hand gesture actions and unmanned aerial vehicle control commands. The self-chosen hand gesture actions may be defined by the wearer himself in an interaction interface of the smart watch. The default hand gesture actions are saved in the smart watch in advance, and do not require the user to design by himself when used, which facilitates directly using by the user.

In the present embodiment, the smart watch terminal 20 comprises: a hand gesture configuring and identifying module 201, a ground control station module 202 and a wireless transmission module 203.

In the process of particular use, the wearer executes a certain hand gesture action. The hand gesture configuring and identifying module 201 collects data from the sensor, identifies out the hand gesture action, looks up the unmanned aerial vehicle control command corresponding to the hand gesture from a correspondence relation between the corresponding hand gesture actions and unmanned aerial vehicle control commands that is saved in advance, and sends the control command to the ground control station module 202. The ground control station module 202 encodes the received unmanned aerial vehicle control command, and converts the unmanned aerial vehicle control command into a control message that meets an unmanned aerial vehicle communication protocol. Then the wireless transmission module 203 wirelessly sends the control message to the unmanned aerial vehicle.

The functions of the above modules in the smart watch terminal will be described below by referring to FIG. 2.

Hand Gesture Configuring and Identifying Module 201

The hand gesture configuring and identifying module 201 is mainly for establishing a hand gesture template and executing a user hand gesture identifying function, thereby providing the user a natural and intuitive hand gesture controlling mode. The module 201 collects the hand gesture data of the wearer using an MEMS sensor and conducts hand gesture identification. The hand gesture configuring and identifying module 201 is provided therein with a default hand gesture action (such as a hand gesture action template established in advance), and can establish and then save the correspondence relation between the default hand gesture action and an unmanned aerial vehicle control command. Alternatively, the hand gesture configuring and identifying module identifies a self-chosen hand gesture action inputted by the wearer by using an interaction interface of the wearable device, and establishes and then saves a correspondence relation between the self-chosen hand gesture action and an unmanned aerial vehicle control command.

Function I: Establishing the Hand Gesture Action Template

When the hand gesture action template is established, the following two factors must be considered: the first is that the hand gestures should be as simple as possible and the user can easily learn and use them; the second is that the hand gestures should be easily identified and distinguished. In the present embodiment, the hand gesture actions are mainly used for controlling unmanned aerial vehicles, so according to the characteristics of unmanned aerial vehicles, several default hand gesture actions are designed in advance, and the correspondence relation between the default hand gesture actions and unmanned aerial vehicle control commands are established and then saved. FIG. 9 shows the correspondence relation between hand gesture actions and different control commands of the unmanned aerial vehicle.

In FIG. 9, a hand gesture action of drawing a first zigzag line from an upper direction to a lower direction and a hand gesture action of drawing a first zigzag line from a lower direction to an upper direction are defined to correspond to a landing control command and a takeoff control command of the unmanned aerial vehicle respectively; a hand gesture action of drawing a rectangle in a clockwise direction and a hand gesture action of drawing a rectangle in an anticlockwise direction are defined to correspond to a right turning control command and a left turning control command of the unmanned aerial vehicle respectively; a hand gesture action of drawing a second zigzag line in the downward direction and a hand gesture action of drawing a second zigzag line from a lower direction to an upper direction are defined to correspond to a lifting control command and a descending control command of the unmanned aerial vehicle respectively; a hand gesture action of drawing a triangle in a clockwise direction is defined to correspond to a hovering control command of the unmanned aerial vehicle.

It should be noted that, FIG. 9 merely shows several hand gesture actions schematically, and in practical use the user may define by himself the correspondence relation between the control commands of the unmanned aerial vehicle and hand gesture actions in the user interaction interface provided by the hand gesture configuring and identifying module. For example, on an interaction interface of the smart watch of the present embodiment, an unmanned aerial vehicle control command list is presented, the selection made by the wearer in the unmanned aerial vehicle control command list presented in the interaction interface is received, and a correspondence relation between the control command selected by the wearer and the corresponding hand gesture action is established; or, a terminating instruction of the wearer is received, and the correspondence relation between the control command of the unmanned aerial vehicle and the corresponding hand gesture action is terminated. Here, the corresponding hand gesture actions may be the default hand gesture actions in the smart watch or self-chosen hand gesture actions inputted by the wearer himself.

Thereby, the control is more personalized, the sense of participation of the user is enhanced, and the user experience is optimized. Moreover, each of the hand gesture actions may be repeatedly used to realize different control commands. For example, if the user likes making a certain hand gesture action in a period of time, the hand gesture action may be set to correspond to a commonly used control command (such as takeoff) of the unmanned aerial vehicle. If the user no longer uses the hand gesture action frequently at a later time, he may delete the hand gesture action and terminate the correspondence relation between the hand gesture action and the control command of the unmanned aerial vehicle. Thereby, the same hand gesture action may be repeatedly used, which avoids designing different hand gesture actions every time.

Different control commands of the unmanned aerial vehicle and corresponding hand gestures are associated and then saved into a database of the smart watch, to facilitate the subsequent searching and matching of the hand gesture actions. After configured successfully, the smart watch can control the unmanned aerial vehicle to execute corresponding operations by making different hand gesture actions.

Function II: Identifying Hand Gesture

In order to enhance the user experience, the requirement on the user's attitude when the user is executing the hand gesture actions should be as low as possible. In order to reduce the power consumption, the complexity of the algorithms and the calculation amount should be as low as possible if the reliability of action identifying can be ensured. Therefore, in the present embodiment, after the data of feature to be identified are collected by an MEMS sensor, the dimension of the feature data to be identified is reduced first by using PCA (Principal Component Analysis) algorithm.

The importance of each of the independent components is determined according to the size of feature values in the calculating process by using PCA, and the most important component is selected. The original acceleration signal is reduced to one dimension. Thereby, the computation complexity is reduced, and a part of noise can be removed, and the requirement on the user's attitude when the user is making the hand gestures can be lowered. Then an identifying algorithm (algorithms such as template matching or machine learning) is further executed to the data the dimension of which has been reduced, to realize accurate hand gesture identification while reducing the computation complexity.

Figure 3:
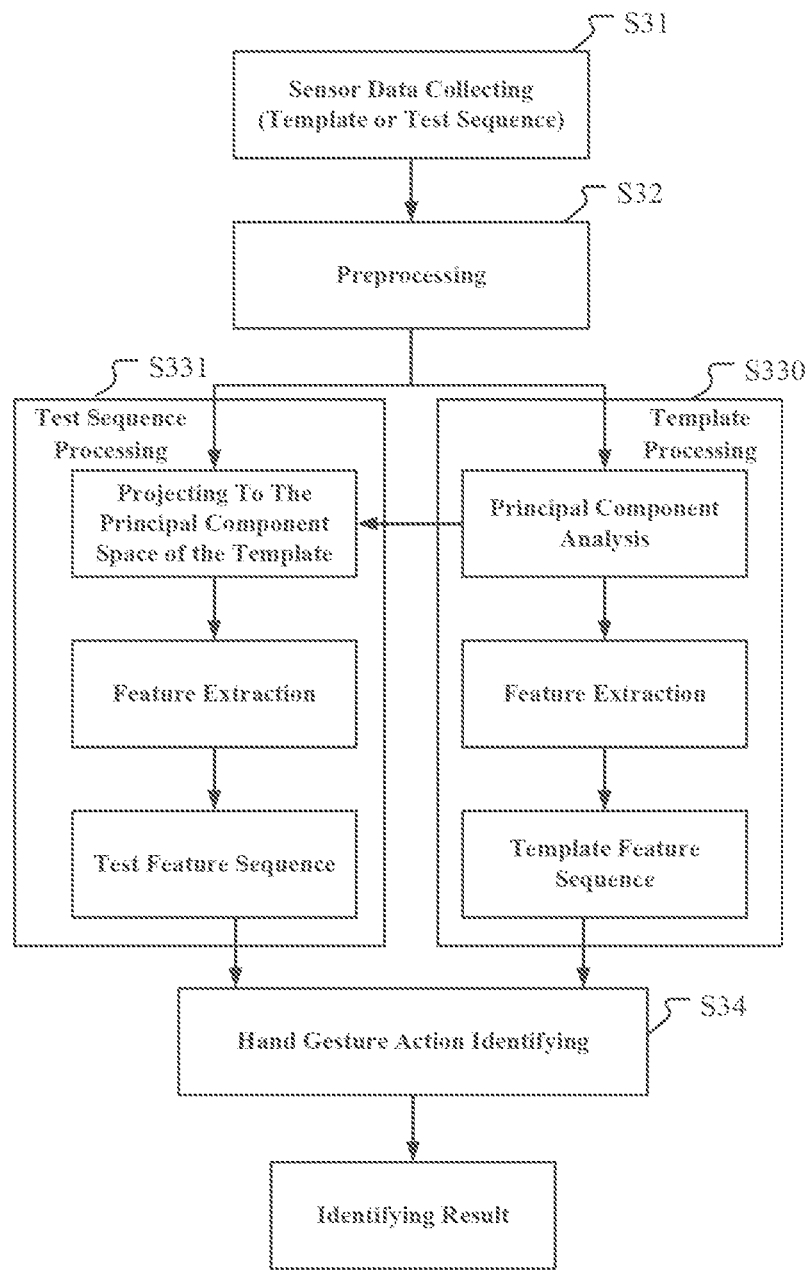
FIG. 3 is a schematic flow diagram of hand gesture identification according to an embodiment of this Application.

FIG. 3 is a schematic flow diagram of the hand gesture identification according to an embodiment of this Application. Referring to FIG. 3, the hand gesture identification based on an acceleration sensor (or an angular velocity sensor) comprises: preprocessing, principal component analysis processing, feature extraction, hand gesture matching, etc. The particular processing with respect to a hand gesture action template and a test sequence (namely, data of a particular feature to be identified) is as follows:

Step S31, collecting data by using an acceleration sensor, to obtain a template sequence (or a test sequence);

Step S32, preprocessing the three-dimensional acceleration sensor data collected, wherein the preprocessing may use a processing method such as average filtering and Butterworth filtering to filter out interference noise;

Step S330, regarding the template sequence, conducting PCA processing to the three-dimensional acceleration sequence, to obtain one dimension template data the dimension of which has been reduced, and obtain the feature vector space of the principal component;

Step S331, regarding the test sequence, projecting the three-dimensional acceleration sequence to the feature vector space of the principal component of the template sequence, to obtain one dimension test data the dimension of which has been reduced; and Step S34, extracting a feature (such as average value and variance of neighboring data points, or directly extracted waveform variation feature) from the obtained one dimension data, to obtain a feature sequence of the template sequence or test sequence, wherein the template feature sequences may be saved into a hand gesture action template database for hand gesture matching, and the test feature sequence and each of the template feature sequences are matched (such as template matching or machine learning method matching and identifying), to obtain the identifying result.

The details of calculating process of hand gesture action identification may be found in the relevant contents of principal component analysis in the prior art, and will not repeated in the present embodiment.

It should be noted that, the present embodiment uses principal component analysis to conduct feature extraction and data dimension reduction to the collected original acceleration signal, but it is not limited thereto, and other dimension reduction means may be used in other embodiments. In addition, the present embodiment is mainly a processing of collecting data sequence by using a three-axis acceleration sensor, but it can be understood that, the technical solutions of this Application may also use hand gesture identification based on other sensors, such as a three-axis angular velocity sensor. The data processing of three-axis angular velocity may be found in the description of the data processing based on the acceleration sensor (or angular velocity sensor).

Ground Control Station Module 202

The ground control station module can display the position and flight data of the unmanned aerial vehicle in real time, and can control the flight mode and parameters of the unmanned aerial vehicle, customize the flight mission, etc. Unlike the ground control system provided on a PC in the prior art, in order to adapt for the characteristics of the smart watches such as the small display interface, in the present embodiment, the ground control station module 202 provides a user interaction interface adapted for the screen size and the operating system of the smart watch, and displays the flight data fed back by the unmanned aerial vehicle and acquired from the wireless transmission module 203 via the user interaction interface; and receives a flight mission, a flight mode and flight data set by the user via the user interaction interface.

In practical use, the organization mode and the operation interface of the ground control station module in the smart watch may be redesigned, to facilitate browsing and operating by the user. Additionally, the ground control station module is added with an interface to the hand gesture configuring and identifying module 201, to receive the unmanned aerial vehicle control commands sent by the hand gesture configuring and identifying module 201 and the flight data fed back by the unmanned aerial vehicle.

Furthermore, considering that the resource of smart watches is limited, and in the process of hand gesture identification, continuously detecting actions will consume a lot of energy, in the present embodiment, the smart watch is provided with a mode controlling module to receive an externally inputted instruction or detect a current quantity of electricity of the wearable device, and when the externally inputted instruction is to activate hand gesture controlling or the current quantity of electricity satisfies a condition for activating hand gesture controlling, notify the hand gesture configuring and identifying module 201 to collect the feature data to be identified of the wearer by using a sensor.

For example, the interaction interface of the smart watch displays a switch selecting interface of the hand gesture controlling modes, and when an input of activating hand gesture controlling mode inputted by the wearer is received, the hand gesture configuring and identifying module is notified to continuously detect and identify the hand gesture of the user. Alternatively, the mode controlling module detects the quantity of electricity of the battery in the smart watch, and if the current quantity of electricity of the battery in the smart watch is lower than a threshold, sends a signal of not acquiring sensor data to the hand gesture configuring and identifying module. Thereby, by providing an option of activating/deactivating the function of controlling the unmanned aerial vehicle on the smart watch, the user can conveniently switches to the normal control mode of the unmanned aerial vehicle when the quantity of electricity of the battery in the smart watch is insufficient, which not only satisfies the controlling demands of the unmanned aerial vehicle but also reduces the power consumption of the smart watch.

After receiving the control command sent by the hand gesture configuring and identifying module 201, the ground control station module 202 encodes and converts it into a control message that meets the MAVLink (Micro Air Vehicle Link) protocol, and then sends it to the unmanned aerial vehicle by using the wireless transmission module 203. The MAVLink protocol is a message blocking library consisting of header files only, which is designed for miniature aerial vehicles and very light. The protocol has been extensively applied to the communication between ground control systems and unmanned aerial vehicles.

Wireless Transmission Module 203

The wireless transmission module 203 is mainly for wirelessly communicating with the unmanned aerial vehicle. In the present embodiment, the wireless transmission module in the smart watch is a Bluetooth wireless transmission module. The wireless communication between the smart watch and the unmanned aerial vehicle may be implemented by two modes. One mode is that, the Bluetooth wireless transmission module of the smart watch establishes a connection with the Bluetooth communication module of the unmanned aerial vehicle, and sends the control message to the unmanned aerial vehicle by Bluetooth communication. The other mode is that, the Bluetooth wireless transmission module establishes a connection with a wireless data communication unit independent of the smart watch, to send the control message to the unmanned aerial vehicle. In this case, the wireless data communication unit comprises a Bluetooth module and other wireless modules, the Bluetooth module communicates with the Bluetooth wireless transmission module in the smart watch, and the other wireless modules communicate with the corresponding wireless communication module of the unmanned aerial vehicle.

The wireless transmission module 203 is for managing the wireless data sending and receiving of the smart watch terminal, and after receiving the control message, sending the control message to the unmanned aerial vehicle by using a wireless link. In addition, the module is also for receiving signals or other flight data fed back by the unmanned aerial vehicle.

Third Embodiment

Figure 4:
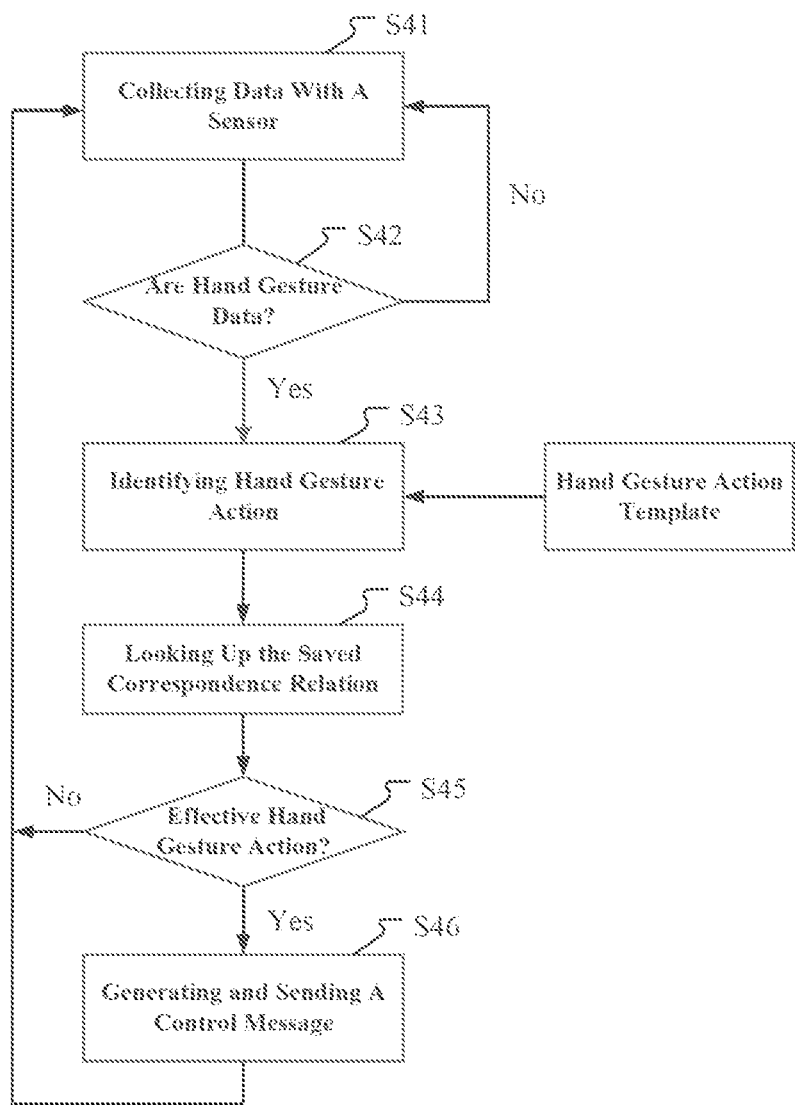
FIG. 4 is a schematic diagram of a work flow of a smart watch terminal according to an embodiment of this Application.

FIG. 4 is a schematic diagram of a work flow of a smart watch terminal according to an embodiment of this Application. Referring to FIG. 4, one control process of the smart watch comprises the following Step S41 to Step S46:

Step S41, collecting data with a sensor.

Feature data to be identified of a wearer is collected by using a sensor. Here the sensor comprises an acceleration sensor and an angular velocity sensor (such as a gyroscope). A three-axis acceleration data sequence or a three-axis angular velocity data sequence to be identified of the wearer is collected by a three-axis acceleration sensor or a three-axis angular velocity sensor.

Step S42, judging whether they are hand gesture data, and if yes, executing Step S43; if no, executing Step S41.

Particularly, taking the acceleration sensor as an example, after the three-axis acceleration data signal is collected, the data such as amplitude variation and variance of the acceleration data are counted. When true hand gesture actions are made, the amplitude and variance of the acceleration will change in a certain range. If they are not in the normal range, they are deemed not hand gesture data, the process returns to Step S41 without executing subsequent steps. In practical use, the wearer may make misoperations or other actions, so it must be judged whether the collected data are hand gesture data, and if they are not hand gesture data, the flow is finished without executing subsequent steps, thereby reducing the calculation amount while ensuring the accuracy of controlling.

Step S43, identifying hand gesture action.

The current hand gesture action is matched to identify the type of the current hand gesture action by using a hand gesture action template that is saved in advance. Particularly, taking the acceleration sensor as an example, after determining that it is possibly a hand gesture action in Step S42, the dimension of the three-axis acceleration data signal is reduced to one dimension first, thereby reducing the computation complexity and noises; then the features of the one-dimensional acceleration signal are extracted to generate a test feature sequence, and matches it with the hand gesture action sequences in the hand gesture action template that are saved in advance, to determine the type of the hand gesture action.

Step S44, looking up a saved correspondence relation.

The smart watch terminal receives the type of the hand gesture action that is determined in Step S43, and looks up the saved correspondence relation between corresponding hand gesture actions and unmanned aerial vehicle control commands, thereby finding an unmanned aerial vehicle control command matching with the hand gesture action.

Step S45, judging whether it is an effective hand gesture action, and if yes, executing Step S46; if no, executing Step S41.

Optionally, the present embodiment further provides a step for judging whether it is an effective hand gesture action (namely, Step S45), to further ensure the accuracy of hand gesture action controlling. In practical use, the wearer may amend the correspondence relation between a hand gesture action and an unmanned aerial vehicle control command on the interaction interface of the smart watch, so it is possible that the hand gesture action identified based on the hand gesture action template has been outdated. For example, the hand gesture action corresponding to the control command of takeoff is drawing a circle in a clockwise direction before it is amended, but at a later time the wearer amended this control command to drawing a rectangle in a clockwise direction. If at this point, the smart watch identifies out that the current hand gesture action of the user is drawing a circle in a clockwise direction, the smart watch determines the hand gesture action as an ineffective hand gesture action. In other words, it does not comply with the currently saved correspondence relation between hand gesture actions and unmanned aerial vehicle control commands.

Step S46, generating and sending a control message.

A control message is generated and wirelessly sent to the unmanned aerial vehicle, to enable the unmanned aerial vehicle to control the flight state according to the control message. Particularly, after the unmanned aerial vehicle control command is obtained, a control message is generated according to the unmanned aerial vehicle control command and output the control message. By now, one hand gesture action controlling is completed. Then the flow returns and repeats Step S41 to Step S46.

Based on the above description, a person skilled in the art should have understood the work flow of the smart watch terminal clearly. The functional structure of the unmanned aerial vehicle end will be described next.

Fourth Embodiment

Figure 5:
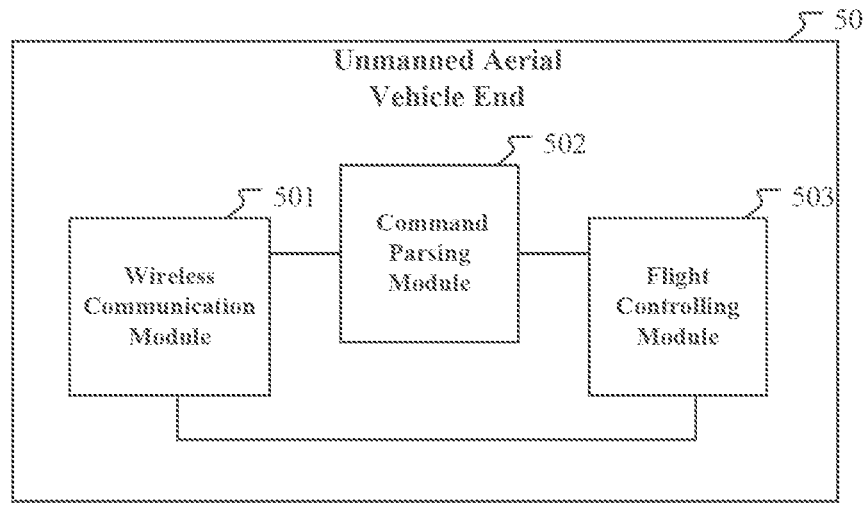
FIG. 5 is a structural block diagram of an unmanned aerial vehicle end according to an embodiment of this Application.

FIG. 5 is a structural block diagram of an unmanned aerial vehicle end according to an embodiment of this Application. Referring to FIG. 5, the unmanned aerial vehicle end 50 mainly comprises three modules: a wireless communication module 501, a command parsing module 502 and a flight controlling module 503. The wireless communication module 501 wirelessly communicates with a wearable device, receives a control message sent by the wearable device, and sends the control message to the command parsing module 502. The command parsing module 502 parses the received control message, and sends the control command obtained by parsing to the flight controlling module 503. The flight controlling module 503 controls a flight state of the unmanned aerial vehicle according to the received control command.

The unmanned aerial vehicle end monitors and receives the control message sent by the smart watch terminal, parses out the corresponding control command, and controls the corresponding parameters of the unmanned aerial vehicle, to complete the control command of the wearer, and may wirelessly send the relevant feedback information to the smart watch terminal.

Wireless Communication Module 501

The wireless communication module 501 is for receiving and sending communication data from/to the smart watch. The wireless communication module 501 monitors the connection request from the smart watch terminal, establishes wireless data links such as Bluetooth to the smart watch, and may further receive its control command after the connection is established; and receives the control message sent by the smart watch terminal, and sends it to the flight controlling module for processing. Furthermore, the module may also send the relevant feedback information (for example, flight data such as position and parameters) to the smart watch terminal.

Command Parsing Module 502

The command parsing module 502 is mainly for parsing and decoding the control message received by the wireless communication module, to acquire the information in the data packet such as the control command. The control command may include two types: a command for changing the flight mode and a command for changing the flight state. After parsing out the particular control command, the module transmits the information to the flight controlling module 503 for further processing.

Flight Controlling Module 503

After receiving the control command of the smart watch terminal, the flight controlling module 503 adjusts the flight mode or the flight state of the unmanned aerial vehicle according to the control command. For example, the module calculates target values of corresponding flight control parameters of the unmanned aerial vehicle according to the received control command, and operates a proportion integration differentiation PID controller to generate a controlling signal by using acquired current values of the corresponding flight control parameters of the unmanned aerial vehicle, to adjust a rotational speed of a rotor wing of the unmanned aerial vehicle and further realize controlling the flight state of the unmanned aerial vehicle.

In the present embodiment, the module may be subdivided into two submodules interconnected: a flight attitude and heading reference submodule, a flight controlling and processing submodule. The two submodules have the function of flight attitude information collecting and the function of flight controlling and processing, respectively.

The flight attitude and heading reference submodule is mainly for collecting data from the sensor on the unmanned aerial vehicle in real time, operating a filtering algorithm to parse out the current information of the unmanned aerial vehicle such as the attitude, the position and the rate, and transferring the information to the flight controlling and processing submodule.

The flight controlling and processing submodule, after receiving the control command from the smart watch terminal in real time, parses and sets the values (target values) that the corresponding flight control parameters (such as roll angle, pitch angle, heading angle and angular rate) of the unmanned aerial vehicle must reach, operates a controller such as PID (Proportion Integration Differentiation) according to the actual information (current values) fed back by the flight attitude and heading reference submodule, calculates out the controlling signals outputted to each of the electrical motors, and sends the signals in the form of PWM (Pulse Width Modulation) signal to a driving circuit to drive the electrical motors to rotate, to adjust the rotational speed of the rotor wing of the unmanned aerial vehicle and further realize controlling the unmanned aerial vehicle.

In addition, the flight controlling module 503 sends the feedback information (such as the current flight state) back to the smart watch terminal via the wireless communication module 501.

Fifth Embodiment

Figure 6:
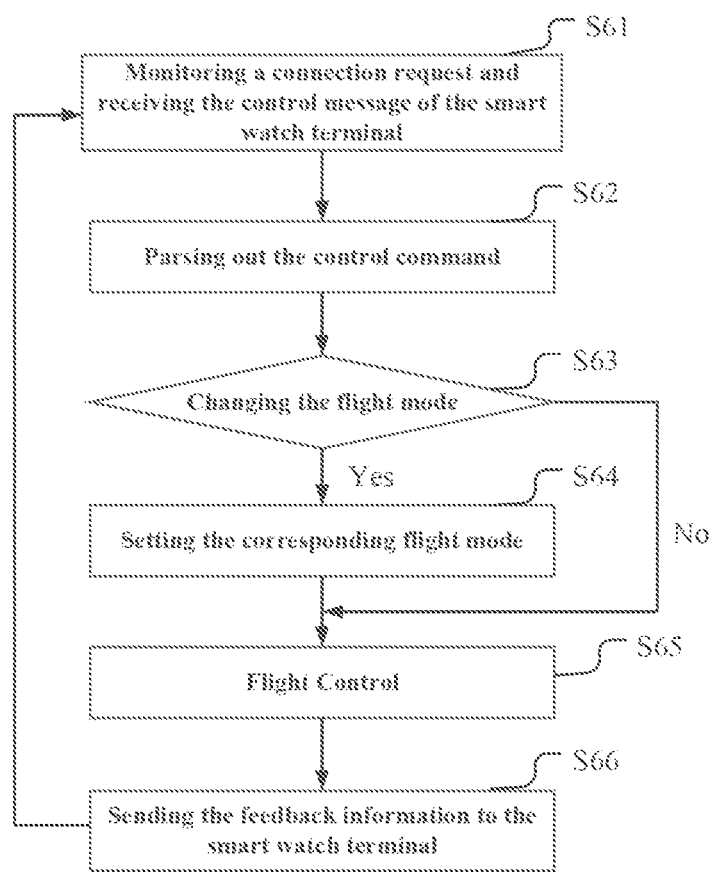
FIG. 6 is a control flow chart of an unmanned aerial vehicle end according to an embodiment of this Application.

FIG. 6 is a control flow chart of the unmanned aerial vehicle end according to an embodiment of this Application. As shown in FIG. 6, the work flow of one control of the controlling end of the unmanned aerial vehicle is shown in the following Step S61 to Step S66.

Step S61, monitoring a connection request and receiving a control message from the smart watch terminal.

Particularly, the unmanned aerial vehicle establishes a wireless connection such as BLE with the smart watch terminal, monitors the connection state, and receives the control message sent by the smart watch terminal after the connection is established.

Step S62, parsing out the unmanned aerial vehicle control command.

The control message is parsed to obtain the particular unmanned aerial vehicle control command.

Step S63, judging whether the control command is to change the flight mode, and if yes, executing Step S64; if no, executing Step S65.

In practical use, the unmanned aerial vehicle control commands may be classified into two types: the control command of changing the flight mode, and the flight control command. When the unmanned aerial vehicle end receives a control command, it judges whether the control command is a flight mode command first. The flight mode herein is, for example, a takeoff flight mode or a landing flight mode. If it is not a control command of changing the flight mode, it will be a control command of conducting flight control.

Step S64, setting a corresponding flight mode.

The unmanned aerial vehicle adjusts the corresponding flight control parameters to complete the control command according to information obtained by parsing the control command.

Step S65, conducting flight control.

Flight control is conducted according to the control command. For example, if the control command is to lift, the unmanned aerial vehicle receives and parses out the control command, adjusts the rotational speed of the rotor wing in the corresponding direction of the unmanned aerial vehicle, and further controls the unmanned aerial vehicle to complete the lifting operation.

Step S66, sending the feedback information to the smart watch terminal.

After the execution is completed, the unmanned aerial vehicle feeds back the execution result (for example, the current lifting height, position and flight state of the unmanned aerial vehicle) to the smart watch terminal, so that the smart watch terminal can display and output the feedback information, to monitor the state of the unmanned aerial vehicle in real time and control correspondingly.

By the above process, the unmanned aerial vehicle realizes executing the corresponding control operation according to the hand gesture action of the smart watch, thereby avoiding the cumbersomeness of carrying and operating controlling devices such as a remote controller or PC, and facilitating control of the unmanned aerial vehicle by the user.

Sixth Embodiment

Figure 7:
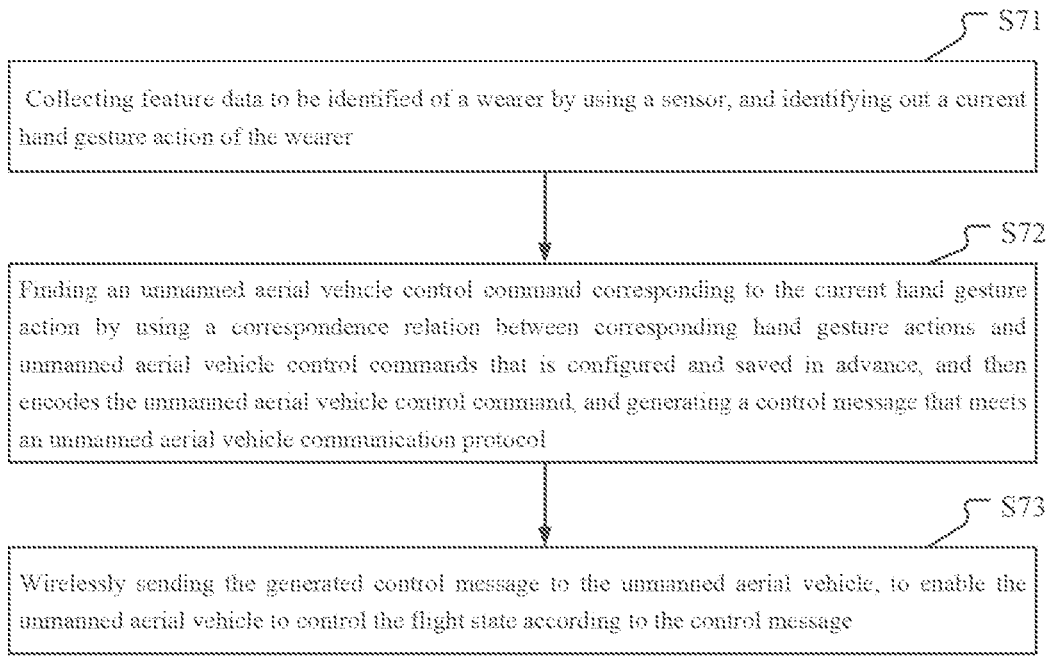
FIG. 7 is a flow chart of a method for realizing controlling an unmanned aerial vehicle by a wearable device according to an embodiment of this Application.

FIG. 7 is a flow chart of a method for realizing controlling an unmanned aerial vehicle by a wearable device according to an embodiment of this Application. The wearable device is provided therein with a sensor. The method comprises:

Step S71, collecting feature data to be identified of a wearer by using a sensor, and identifying out a current hand gesture action of the wearer.

In order to enhance the user experience, the requirement on the user's attitude when the user is executing the hand gesture actions should be as low as possible. In order to reduce the power consumption, the complexity of the algorithms and the calculation amount should be as low as possible if the reliability of action identifying can be ensured. Therefore, in the present embodiment, after the feature data to be identified are collected by an MEMS sensor, the dimension of the data of feature to be identified is reduced first by using PCA (Principal Component Analysis) algorithm. Regarding a hand gesture action template and a test sequence, namely, data of a particular feature to be identified, the particular processing is as follows:

the hand gesture action module collects data by using an acceleration sensor, to obtain a template sequence (or test sequence);

the hand gesture action module preprocesses the three-dimensional acceleration sensor data collected, and a processing method such as average filtering and Butterworth filtering may be used to filter out interference noise;

regarding the template sequence, PCA processing is conducted to the three-dimensional acceleration sequence, to obtain one dimension template data the dimension of which has been reduced, and obtain the feature vector space of the principal component;

regarding the test sequence, the three-dimensional acceleration sequence is projected to the feature vector space of the principal component of the template sequence, to obtain one dimension test data the dimension of which has been reduced; and features (such as the average value and variance of neighboring data points, or directly extracted the waveform variation feature) are extracted from the obtained one dimension data, to obtain a feature sequence of the template sequence or test sequence, wherein the template feature sequence may be saved into a hand gesture action template database for hand gesture matching. The test feature sequence and each of the template feature sequences (such as template matching or machine learning method matching identifying) are matched to obtain the identifying result.

Considering that the resource of smart watches is limited, and in the process of hand gesture identification, continuously detecting actions will consume a lot of energy, in the present embodiment, the mode controlling module of the wearable device may receive an externally inputted instruction or detect a current quantity of electricity of the wearable device, and when the externally inputted instruction is to activate hand gesture controlling or the current quantity of electricity satisfies a condition for activating hand gesture controlling, notify the hand gesture configuring and identifying module to collect feature data to be identified of the wearer by a sensor.

Step S72, finding an unmanned aerial vehicle control command corresponding to the current hand gesture action by using a correspondence relation between corresponding hand gesture actions and unmanned aerial vehicle control commands that is configured and saved in advance, and then encoding the unmanned aerial vehicle control command, and generating a control message that meets an unmanned aerial vehicle communication protocol.

When the hand gesture action templates is established, the following two factors must be considered: the first is that the hand gestures should be as simple as possible and the user can easily learn and use them; the second is that the hand gestures should be easily identified and distinguished. In the present embodiment, the hand gesture actions are mainly used for controlling unmanned aerial vehicles, so according to the characteristics of unmanned aerial vehicles, several default hand gesture actions are designed in advance, and a correspondence relation between the default hand gesture actions and unmanned aerial vehicle control commands is established and then saved, as shown in FIG. 9.

Referring to FIG. 9, a hand gesture action of drawing a first zigzag line from an upper direction to a lower direction and a hand gesture action of drawing a first zigzag line from a lower direction to an upper direction are defined to correspond to a landing control command and a takeoff control command of the unmanned aerial vehicle respectively; a hand gesture action of drawing a rectangle in a clockwise direction and a hand gesture action of drawing a rectangle in an anticlockwise direction are defined to correspond to a right turning control command and a left turning control command of the unmanned aerial vehicle respectively; a hand gesture action of drawing a second zigzag line in the top-to-bottom direction and a hand gesture action of drawing a second zigzag line in the bottom-to-top direction are defined to correspond to a lifting control command and a descending control command of the unmanned aerial vehicle respectively; a hand gesture action of drawing a triangle in a clockwise direction is defined to correspond to a hovering control command of the unmanned aerial vehicle.

Step S73, wirelessly sending the generated control message to the unmanned aerial vehicle, to enable the unmanned aerial vehicle to control the flight state according to the control message.

The ground control station module of the wearable device can display the position and flight data of the unmanned aerial vehicle in real time, and control the flight mode and parameters of the unmanned aerial vehicle, customize the flight mission, etc. Unlike the ground control system provided on a PC in the prior art, in order to adapt for the characteristics of the smart watches such as the small display interface, in the present embodiment, the wearable device may provide a user interaction interface adapted for the screen size and the operating system of the wearable device, and display the flight data fed back by the unmanned aerial vehicle and acquired from the wireless transmission module 203 via the user interaction interface; and receive a flight mission, a flight mode and flight data set by the user via the user interaction interface.

The above Steps S71 to S73 are all completed at the wearable device side, for example, by the corresponding modules provided in the wearable device respectively.

In the present embodiment, there may be two wireless connection modes between the wearable device and the unmanned aerial vehicle. One mode is that, the wearable device establishes a direct connection with the Bluetooth receiving module corresponding to the unmanned aerial vehicle by using BLE, and wirelessly sends the generated control message to the unmanned aerial vehicle. This connection mode is simple but the communication distance is limited.

The other mode is that, the wearable device establishes a connection with an external wireless data communication unit by using BLE, and simultaneously the wireless data communication unit establishes a connection with the wireless communication module of the unmanned aerial vehicle end to wirelessly send the generated control message to the unmanned aerial vehicle. This connection mode is suitable for a longer communication distance.

In the present embodiment, the method for realizing controlling an unmanned aerial vehicle by using a wearable device comprises: first, establishing a wireless connection between the wearable device and the unmanned aerial vehicle according to the above two modes; then, after the wearable device activates the hand gesture controlling mode, acquiring three-dimensional acceleration data by using the MEMS sensor in the wearable device, identifying the particular hand gesture action executed by the user by using a preset algorithm, and sending a control command corresponding to the hand gesture action to the unmanned aerial vehicle; finally, by the flight controlling module of the unmanned aerial vehicle, changing the flight mode or adjusting the corresponding flight parameters according to the received hand gesture controlling command.

In order to satisfy the demands of the wearable device on resource and power consumption, the present embodiment uses algorithms such as PCA (principal component analysis) to reduce the dimension of data. The importance of each of the independent components is determined according to the feature values in the calculating process by using principal component analysis, and the most important component is selected. The original acceleration signal is reduced to one dimension. Thereby, the computation complexity is reduced, and a part of noise can be removed, and the requirement on the user's attitude when the user is making the hand gestures can be lowered. Then an identifying algorithm (algorithms such as template matching or machine learning) is further executed to the data, the dimension of which has been reduced, to realize accurate hand gesture identification while reducing the computation complexity.

In order to realize controlling the unmanned aerial vehicle by the wearable device, before the first use, the correspondence relation between the corresponding hand gesture actions and the unmanned aerial vehicle control commands is established in the following way: receiving a control command selected by the wearer from an unmanned aerial vehicle control command list presented in an interaction interface of the wearable device, and establishing a correspondence relation between the control command selected by the wearer and the corresponding hand gesture action; or, receiving a terminating instruction of the wearer, and terminating the correspondence relation between the control command of the unmanned aerial vehicle and the corresponding hand gesture action; wherein the corresponding hand gesture action comprises a default hand gesture action and a self-chosen hand gesture action.

For example, in the configuring interface of the ground control system, regarding a control command of changing the flight mode or a control command of changing the flight state, self-defined hand gesture actions inputted by the wearer or default hand gesture actions are associated with different control commands of the unmanned aerial vehicle. In practical control, the user can send the corresponding control commands to the unmanned aerial vehicle by executing different hand gesture actions by using the wearable device, and then the flight controlling module of the unmanned aerial vehicle further controls the flight mode or location and posture of the unmanned aerial vehicle according to the control commands. It should be noted that, other steps of the method for realizing controlling an unmanned aerial vehicle by a wearable device in the present embodiment may be found in the relevant description in the working process of the wearable device of this Application, and are not repeated here.

Seventh Embodiment

Figure 8:
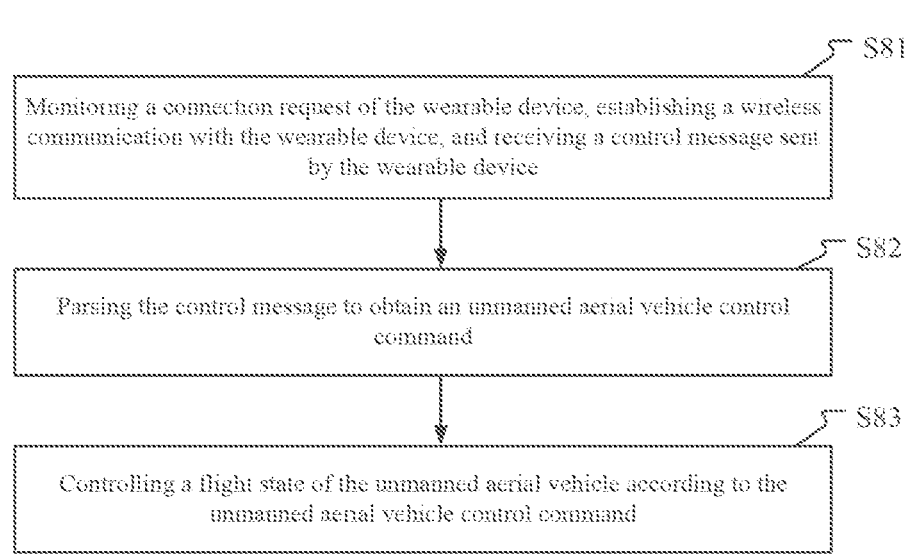
FIG. 8 is a flow chart of a method for realizing controlling an unmanned aerial vehicle by a wearable device according to another embodiment of this Application.

FIG. 8 is a flow chart of a method for realizing controlling an unmanned aerial vehicle by a wearable device according to another embodiment of this Application. The method for realizing controlling an unmanned aerial vehicle by a wearable device comprises:

Step S81, monitoring a connection request of the wearable device, establishing a wireless communication with the wearable device, and receiving a control message sent by the wearable device;

Step S82, parsing the control message to obtain an unmanned aerial vehicle control command; and Step S83, controlling a flight state of the unmanned aerial vehicle according to the unmanned aerial vehicle control command.

It should be noted that, other steps of the method for realizing controlling an unmanned aerial vehicle by a wearable device in the present embodiment may be found in the relevant description in the working process of the wearable device of this Application, and are not repeated here.

In conclusion, according to this Application, the ground control system operates in the wearable device, and collects the hand gesture action of the wearer by using a built-in sensor. Thereby, the user can conduct convenient and intuitive control for the unmanned aerial vehicle by executing a certain hand gesture action via the wearable device being worn, and need not carry other devices such as a ground control system or a remote controller, thereby avoiding relatively complicated control modes by using other devices. Such a mode of hand gesture identification based on a sensor is flexible and reliable, unaffected by environment and light, and can be realized by a simple system.

In addition, wearable devices are generally worn on the body of the user for a long term, and the user can give different unmanned aerial vehicle control commands by executing certain hand gesture actions at any moment, the interaction between and the unmanned aerial vehicle can be realized more conveniently and intuitively, and the user experience can be enhanced greatly compared with the traditional modes of controlling an unmanned aerial vehicle.

Furthermore, this Application improves the hand gesture action identifying algorithm, by reducing the original data of feature to be identified to one dimension by using PCA, while the conventional methods basically operate with respect to three-dimensional data. Therefore, this Application greatly reduces the computation complexity and the power consumption when controlling an unmanned aerial vehicle by the wearable device. As three dimensional data become one dimension, the requirement on the user's attitude when the user is executing the hand gestures is also reduced greatly, and the user can execute the hand gestures more freely, thereby improving the competitiveness of the wearable device.

The above description is merely preferable embodiments of this Application, and is not intended to limit the protection scope of this Application. Any modifications, equivalent substitutions or improvements made within the spirit and principle of this Application shall all be included in the protection scope of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A wearable device, comprising: a hand gesture configuring and identifying module, a ground control station module and a wireless transmission module;

the hand gesture configuring and identifying module is for collecting feature data to be identified of a wearer by a sensor, identifying out a current hand gesture action of the wearer, searching a correspondence relation between a hand gesture action and an unmanned aerial vehicle control command that is configured and saved in advance, and sending an unmanned aerial vehicle control command corresponding to the hand gesture action to the ground control station module;

the ground control station module is for receiving the unmanned aerial vehicle control command by using a data interface between the ground control station module and the hand gesture configuring and identifying module, encoding the unmanned aerial vehicle control command and converting it into a control message that meets an unmanned aerial vehicle communication protocol, and sending the control message to the wireless transmission module; and the wireless transmission module is for receiving the control message and wirelessly sending the control message to the unmanned aerial vehicle to realize controlling a flight state of the unmanned aerial vehicle according to the control message.

2. The wearable device according to claim 1, wherein the hand gesture configuring and identifying module is provided therein with a default hand gesture action, and the hand gesture configuring and identifying module establishes and then saves a correspondence relation between the default hand gesture action and an unmanned aerial vehicle control command;

or, the hand gesture configuring and identifying module identifies a self-chosen hand gesture action inputted by the wearer via an interaction interface of the wearable device, and establishes and then saves a correspondence relation between the self-chosen hand gesture action and an unmanned aerial vehicle control command.

3. The wearable device according to claim 2, wherein the hand gesture configuring and identifying module establishes the correspondence relation between the default hand gesture action and the unmanned aerial vehicle control command particularly by:

defining a hand gesture action of drawing a first zigzag line from an upper direction to a lower direction and a hand gesture action of drawing a first zigzag line from a lower direction to an upper direction to correspond to a landing control command and a takeoff control command of the unmanned aerial vehicle respectively;

defining a hand gesture action of drawing a rectangle in a clockwise direction and a hand gesture action of drawing a rectangle in an anticlockwise direction to correspond to a right turning control command and a left turning control command of the unmanned aerial vehicle respectively;

defining a hand gesture action of drawing a second zigzag line from an upper direction to a lower direction and a hand gesture action of drawing a second zigzag line from a lower direction to an upper direction to correspond to a lifting control command and a descending control command of the unmanned aerial vehicle respectively; and defining a hand gesture action of drawing a triangle in a clockwise direction to correspond to a hovering control command of the unmanned aerial vehicle.

4. The wearable device according to claim 1, wherein the hand gesture configuring and identifying module is particularly for:

collecting a three-axis acceleration data sequence or a three-axis angular velocity data sequence to be identified of the wearer by a three-axis acceleration sensor or a three-axis angular velocity sensor;

extracting a feature from the three-axis acceleration data sequence or the three-axis angular velocity data sequence by using principal component analysis, and reducing a dimension of the three-axis acceleration data sequence or the three-axis angular velocity data sequence to one dimension; and comparing one-dimensional acceleration data sequence or one-dimensional angular velocity data sequence obtained by reducing dimension with a corresponding template feature data sequence, to identify out the current hand gesture action of the wearer;

wherein the template feature data sequence comprises an acceleration template data sequence and an angular velocity template data sequence, and the dimension of the acceleration template data sequence and the dimension of the angular velocity template data sequence are one dimension.

5. The wearable device according to claim 1, further comprising:

a mode controlling module, for receiving an externally inputted instruction or detecting a current quantity of electricity of the wearable device, and when the externally inputted instruction is to activate hand gesture controlling or the current quantity of electricity satisfies a condition for activating hand gesture controlling, notifying the hand gesture configuring and identifying module to collect feature data to be identified of the wearer by a sensor.

6. The wearable device according to claim 1, wherein the ground control station module provides a user interaction interface adapted for a screen size and an operating system of the wearable device, and displays flight data fed back by the unmanned aerial vehicle and acquired from the wireless transmission module via the user interaction interface; and receives a flight mission, a flight mode and flight data set by the user via the user interaction interface.

7. The wearable device according to claim 1, wherein the wireless transmission module is a Bluetooth wireless transmission module; and the Bluetooth wireless transmission module establishes a connection with a Bluetooth communication module of the unmanned aerial vehicle, and sends the control message to the unmanned aerial vehicle by Bluetooth communication;

or, the Bluetooth wireless transmission module establishes a connection with a wireless data communication unit external to the wearable device, and communicates with a wireless communication module of the unmanned aerial vehicle via the wireless data communication unit, to send the control message to the unmanned aerial vehicle.

8. The wearable device according to claim 1, wherein the wireless transmission module is a Bluetooth wireless transmission module; and the Bluetooth wireless transmission module receives a signal fed back by the unmanned aerial vehicle.

9. An apparatus for controlling an unmanned aerial vehicle, comprising: a wireless communication module, a command parsing module and a flight controlling module;

the wireless communication module is for wirelessly communicating with a wearable device, receiving a control message sent by the wearable device, and sending the control message to the command parsing module;

the command parsing module is for parsing the received control message, and sending a control command obtained by parsing to the flight controlling module; and the flight controlling module is for controlling a flight state of the unmanned aerial vehicle according to the received control command, wherein the flight controlling module is particularly for calculating target values of corresponding flight control parameters of the unmanned aerial vehicle according to the received control command, and operating a proportion integration differentiation PID controller to generate a controlling signal by using acquired current values of the corresponding flight control parameters of the unmanned aerial vehicle, to adjust a rotational speed of a rotor wing of the unmanned aerial vehicle and further realize controlling the flight state of the unmanned aerial vehicle.

10. A method for realizing controlling an unmanned aerial vehicle by a wearable device, wherein the wearable device is provided therein with a sensor, and the method comprises:

by the wearable device, collecting feature data to be identified of a wearer by using the sensor, and identifying out a current hand gesture action of the wearer;

by the wearable device, finding an unmanned aerial vehicle control command corresponding to the current hand gesture action by using a correspondence relation between corresponding hand gesture actions and unmanned aerial vehicle control commands that is configured and saved in advance, and then encoding the unmanned aerial vehicle control command and generating a control message that meets an unmanned aerial vehicle communication protocol; and by the wearable device, wirelessly sending the generated control message to the unmanned aerial vehicle, to enable the unmanned aerial vehicle to control the flight state according to the control message.

11. The method according to claim 10, further comprising:

establishing the correspondence relation between the corresponding hand gesture actions and the unmanned aerial vehicle control commands by:

by the wearable device, receiving a control command selected by the wearer from an unmanned aerial vehicle control command list presented in an interaction interface of the wearable device, and establishing the correspondence relation between the control command selected by the wearer and the corresponding hand gesture action; or, receiving a terminating instruction of the wearer, and terminating the correspondence relation between the control command of the unmanned aerial vehicle and the corresponding hand gesture action;

wherein the corresponding hand gesture action comprises a default hand gesture action and a self-chosen hand gesture action.

12. The method according to claim 11, further comprising:

by the wearable device, establishing a correspondence relation between the default hand gesture action and the unmanned aerial vehicle control command by:

defining a hand gesture action of drawing a first zigzag line from an upper direction to a lower direction and a hand gesture action of drawing a first zigzag line from a lower direction to an upper direction to correspond to a landing control command and a takeoff control command of the unmanned aerial vehicle respectively;

defining a hand gesture action of drawing a rectangle in a clockwise direction and a hand gesture action of drawing a rectangle in an anticlockwise direction to correspond to a right turning control command and a left turning control command of the unmanned aerial vehicle respectively;

defining a hand gesture action of drawing a second zigzag line from an upper direction to a lower direction and a hand gesture action of drawing a second zigzag line from a lower direction to an upper direction to correspond to a lifting control command and a descending control command of the unmanned aerial vehicle respectively; and defining a hand gesture action of drawing a triangle in a clockwise direction to correspond to a hovering control command of the unmanned aerial vehicle.

13. The method according to claim 10, wherein the step of by the wearable device, collecting feature data to be identified of a wearer by using the sensor, and identifying out a current hand gesture action of the wearer comprises:

collecting a three-axis acceleration data sequence or a three-axis angular velocity data sequence to be identified of the wearer by a three-axis acceleration sensor or a three-axis angular velocity sensor;

extracting a feature from the three-axis acceleration data sequence or the three-axis angular velocity data sequence by using principal component analysis, and reducing a dimension of the three-axis acceleration data sequence or the three-axis angular velocity data sequence to one dimension; and comparing one-dimensional acceleration data sequence or one-dimensional angular velocity data sequence obtained by reducing dimension with a corresponding template feature data sequence, to identify out the current hand gesture action of the wearer;

wherein the template feature data sequence comprises an acceleration template data sequence and an angular velocity template data sequence, and the dimension of the acceleration template data sequence and the dimension of the angular velocity template data sequence are one dimension.

14. The method according to claim 10, further comprising:

by the wearable device, receiving an externally inputted instruction or detecting a current quantity of electricity of the wearable device, and when the externally inputted instruction is to activate hand gesture controlling or the current quantity of electricity satisfies a condition for activating hand gesture controlling, collecting the data of feature to be identified of the wearer by a sensor.

15. The method according to claim 10, further comprising:

by the wearable device, providing a user interaction interface adapted for a screen size and an operating system of the wearable device, and displaying flight data fed back by the unmanned aerial vehicle via the user interaction interface; and receiving a flight mission, a flight mode and flight data set by the user via the user interaction interface.

16. The method according to claim 10, wherein the step of by the wearable device, wirelessly sending the generated control message to the unmanned aerial vehicle comprises:

by the wearable device, establishing a connection with a Bluetooth communication module of the unmanned aerial vehicle, and sending the control message to the unmanned aerial vehicle by Bluetooth communication;

or, by the wearable device, establishing a connection with a wireless data communication unit external to the wearable device, and communicating with a wireless communication module of the unmanned aerial vehicle via the wireless data communication unit, to send the control message to the unmanned aerial vehicle.

* * * * *